United States Patent [19]

Hamada

[11] Patent Number: 4,594,376
[45] Date of Patent: Jun. 10, 1986

[54] PROPYLENE POLYMER COMPOSITION

[75] Inventor: Yoshinori Hamada, Oita, Japan

[73] Assignee: Showa Denko Kabushiki Kaisha, Tokyo, Japan

[21] Appl. No.: 648,226

[22] Filed: Sep. 7, 1984

[30] Foreign Application Priority Data

Sep. 7, 1983 [JP] Japan .................. 58-163200
Sep. 8, 1983 [JP] Japan .................. 58-164137
Sep. 22, 1983 [JP] Japan .................. 58-174372

[51] Int. Cl.[4] ............................................. C08K 5/34
[52] U.S. Cl. .................... 524/101; 524/208; 524/296; 525/281; 525/306
[58] Field of Search ............ 524/208, 101, 296; 525/281, 306

[56] References Cited

U.S. PATENT DOCUMENTS

| | | | |
|---|---|---|---|
| 3,141,850 | 7/1964 | Lybeck | 524/101 |
| 3,275,592 | 9/1966 | Oswald et al. | 524/101 |
| 3,294,869 | 12/1966 | Robinson | 525/306 |
| 3,806,555 | 4/1974 | Nagaoka et al. | 525/306 |
| 3,845,166 | 10/1974 | Betts et al. | 524/101 |
| 4,018,852 | 4/1977 | Schober | 524/101 |
| 4,031,299 | 6/1977 | Wei | 525/306 |
| 4,260,541 | 4/1981 | Kolinsky et al. | 524/101 |

Primary Examiner—Joseph L. Schofer
Assistant Examiner—N. Sarofim
Attorney, Agent, or Firm—Sughrue, Mion, Zinn, Macpeak, and Seas

[57] ABSTRACT

A propylene polymer composition containing (i) 100 parts by weight of a polypropylene and/or a propylene-ethylene copolymer and (ii) 0.05 to 2 parts by weight of triallyl(iso)cyanurate and/or diallyl(iso)phthalate, or (i) 100 parts by weight of a polypropylene and/or a propylene-ethylene copolymer, (ii) 0.01 to 0.5 part by weight of triallyl(iso)cyanurate and/or diallyl(iso)phthalate, and (iii) 0.005 to 0.2 part by weight of an organic peroxide.

This propylene composition has excellent resistance against high-energy radiation without impairing the desired properties of the propylene polymer per se.

3 Claims, No Drawings

PROPYLENE POLYMER COMPOSITION

BACKGROUND OF THE INVENTION

1. Field of the Invention

The present invention relates to a propylene polymer composition. More specifically, it relates to a propylene polymer composition having resistance against radiation (i.e., high-energy radiation such as gamma rays and high-energy electron beam). The term "propylene polymer" used herein means polypropylene and propylene-ethylene copolymers.

2. Description of the Prior Art

Propylene polymer is widely used for formed or molded articles. When molded articles of propylene polymer are used as, for example, medical equipments or accessories, they may be exposed to radiation such as γ-rays. Radiation exposure causes degradation of molded articles of propylene polymer. Thus, specifically, it remarkably decreases the tensile elongation of the articles, making the articles brittle, and causes yellowing and cracking.

Various attempts have been made to prevent the degradation of polyolefins due to radiation, as proposed in Japanese Unexamined Patent Publication (Kokai) Nos. 55-19199, 58-42638, and 58-49737. These publications disclose the addition of hindered amine compounds or phenolic derivatives to resins. As mentioned above, when conventional propylene polymer compositions are subjected to, for example, 2.5 to 3.0 Mrad irradiation of cobalt-60, they are degraded and the elongation after the irradiation is remarkably decreased. However, when the above-proposed additives are incorporated into propylene polymer compositions, the desired radiation stability effect cannot be sufficiently exhibited. Furthermore, the commercial value of the molded articles obtained therefrom is often impaired due to the discoloration caused by the additives.

SUMMARY OF THE INVENTION

Accordingly, the objects of the present invention are to eliminate the above-mentioned problems of the prior art and to provide a propylene polymer composition having improved resistance against the radiation.

Other objects and advantages of the present invention will be apparent from the following description.

In accordance with the present invention, there is provided a propylene polymer composition comprising (i) 100 parts by weight of at least one propylene polymer selected from the group consisting of polypropylenes and propylene-ethylene copolymers and (ii) 0.05 to 2 parts by weight of at least one modifier selected from the group consisting of triallylcyanurate, triallylisocyanurate, diallylphthalate, and diallylisophthalate.

In accordance with the present invention, there is also provided a propylene polymer composition comprising (i) 100 parts by weight of at least one propylene polymer selected from the group consisting of polypropylenes and propylene-ethylene copolymers, (ii) 0.01 to 0.4 parts by weight of at least one modifier selected from the group consisting of triallylcyanurate, triallylisocyanurate, diallylphthalate, and diallylisophthalate, and (iii) 0.005 to 0.2 parts by weight of an organic peroxide.

DESCRIPTION OF THE PREFERRED EMBODIMENT

The polymer components usable in the present invention are conventional polypropylenes and propylene-ethylene copolymers. Although there is no critical ethylene content in the propylene-ethylene copolymers, the preferable ethylene content is 7% by weight or less, more preferably 2% to 4% by weight. There is also no limitation in the melt flow index (MFI) of these propylene polymers. However, propylene polymers having an MFI of 1 to 50, determined at 230° C. under a load of 2.16 kg according to a Japanese Industrial Standard (JIS) K 6758 method, can be preferably used in the propylene polymer composition of the present invention for injection molding, although this range may vary depending upon forming or molding processes. These polymers may be used alone or in any mixture thereof in the present polymer compositions.

The modifiers usable in the present invention are those selected from triallyl(iso)cyanurate (i.e., triallylcyanulate and/or triallylisocyanurate) and diallyl(iso)phthalate (i.e., diallylphthalate and/or diallylisophthalate). These modifiers may be used alone or in any mixture thereof in the present polymer compositions.

The modifiers are used in the present propylene polymer compositions in an amount of 0.05 to 2 parts by weight, preferably 0.05 to 1 part by weight, based on 100 parts by weight of the propylene polymer. When the amount of the modifier is less than 0.05 part by weight, the desired improvement in the radiation stability of the propylene polymer composition cannot be attained. Contrary to this, when the amount of the modifier is more than 2 parts by weight, the tensile elongation of the molded articles derived from the resultant polymer composition tends to be decreased.

According to a second embodiment of the present invention, the propylene polymer compositions contain organic peroxides in combination with the above-mentioned modifiers.

The organic peroxides usable in the second embodiment of the present invention are those having a decomposition half-life time of more than one second at the melting point of the propylene polymers (e.g., 115° C. to 170° C.) and less than 10 minutes at a temperature of 300° C. Examples of such organic peroxides are: hydroperoxides such as t-butyl hydroperoxide and cumene hydroperoxide; dialkyl peroxides such as dicumyl peroxide, 2,5-dimethyl-2,5-di(t-butylperoxy)hexane, and 2,5-dimethyl-2,5-(t-butylperoxy)hexane-3; diacyl peroxides such as lauroyl peroxide, benzoyl peroxide, and 1,3-bis-(t-butylperoxyisopropyl)benzene; peroxy esters such as t-butyl peroxyacetate and t-butyl peroxylaurate; ketone peroxides such as methyl ethyl ketone peroxide and methyl isobutyl ketone peroxide; peroxy dicarbonates such as diisopropyl peroxy dicarbonate; and silicon peroxides such as vinyl tris(t-butylperoxy)silane. These peroxides may be used alone or in any mixture thereof.

The above-mentioned organic peroxides are used, together with the above-mentioned modifiers, in the present polymer compositions in an amount of 0.005 to 0.2 part by weight, preferably 0.005 to 0.1 part by weight, based on 100 part by weight of the propylene polymer. The organic peroxides seem to attack portions capable of readily generating radicals (e.g., double bonds present in the polymer chains of the propylene polymer). However, the use of a too large amount of the organic peroxide in the present polymer composition unpreferably causes intensive polymer chain scissions and, therefore, a propylene polymer composition having a practically applicable molecular weight cannot be obtained.

When the above-mentioned modifier is used in combination with the organic peroxide in the present polymer composition, the modifier is used in the present propylene polymer composition in an amount of 0.01 to 0.4 part by weight, preferably 0.05 to 0.25 part by weight, based on 100 parts by weight of the propylene polymer. When the amount of the modifier is less than 0.01 part by weight, the desired improvement in the radiation stability of the propylene polymer composition cannot be attained. Contrary to this, when the amount of the modifier is more than 0.4 part by weight, the physical properties of the molded articles obtained therefrom are decreased with the lapse of time after radiation.

When the above-mentioned modifier is used in combination with the organic peroxide in the present polymer composition, degradation with the lapse of time of the molded articles exposed to radiation can be advantageously prevented.

The propylene polymer composition according to the present invention may optionally contain various conventional ingredients or additives. For example, propylene-ethylene copolymer having a higher ethylene content or ethylene-propylene rubber may be blended with the present polymer composition to improve the impact resistance thereof at a lower temperature. Clarifiers or nucleating agents such as sodium benzoate, dibenzylidene sorbitol, and bis(p-methylbenzylidiene)sorbitol may also be included in the present polymer composition to provide clarity to the composition. Examples of other ingredients or additives are anti-oxidants, ultraviolet light absorbers, lubricants, antistatic agents, antiblocking agents, dispersion aids, and stabilizers for various purposes.

The present polymer compositions can be prepared in any conventional manner so long as the above-mentioned ingredients are uniformly mixed. Generally, powdered polypropylene or propylene-ethylene copolymer is appropriately blended with the modifier or the modifier and organic peroxide and, optionally, various other ingredients or additives. The mixture is pelletized through an appropriate extruder. The pellets thus obtained can be molded or formed to various articles by, for example, injection molding.

According to the present invention, when the polymer composition is subjected to high-energy radiation, the change in the MFI is very small. Furthermore, when the molded article obtained from the present polymer composition is subjected to radiation, the undesirable degradation and yellowing of the article can be effectively prevented. Especially, when the modifier is used in combination with the organic peroxide in the present polymer composition, the gradual degradation, with the lapse of time, of the molded articles exposed to radiation can be effectively prevented.

EXAMPLE

The present invention now will be further illustrated by, but is by no means limited to, the following Examples and Comparative Examples. In these Examples all parts and percentages are expressed on a weight basis unless otherwise specified.

EXAMPLES 1 TO 5 AND COMPARATIVE EXAMPLES 1 TO 4

A 100 part amount of a polymer composition I, II, or III each having the following composition was thoroughly mixed with triallylcyanurate (TAC) and/or triallylisocyanurate (TAIC) in an amount listed in Table 1.

| (1) Polymer I | |
|---|---|
| Propylene-ethylene random copolymer (ethylene[content = 1.8%, MFI = 18 g/10 min) | 99.9% |
| Tetrakis methylene (3,5-di-t-butyl-4-hydroxyphenyl)propionate]methane (available from Ciba-Geigy Co.) | 0.05% |
| Calcium stearate | 0.05% |
| (2) Polymer II | |
| Polypropylene homopolymer (MFI = 20 g/10 min) | 99.9% |
| Tetrakis [methylene (3,5-di-t-butyl-4-hydroxyphenyl)propionate]methane | 0.05% |
| Calcium stearate | 0.05% |
| (3) Polymer III | |
| Polypropylene homopolymer (MFI = 20 g/10 min) | 99.9% |
| Tetrakis [methylene(3,5-di-t-butyl-4-hydroxyphenyl)propionate]methane | 0.05% |
| Sanol LS 944 (hindered amine manufactured by Sankyo Co., Ltd.) | 0.05% |
| (4) Triallylcyanurate (TAC) | |

TAC having the following formula manufactured by Wako Junyaku Co., Ltd. (Product Code No. 201-02292):

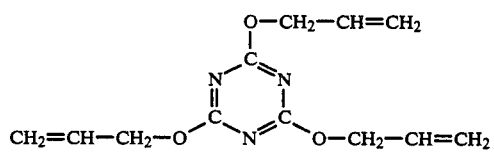

(5) Triallylisocyanurate (TAIC)

TAIC having the following formula manufactured by Nippon Kasei Co., Ltd.

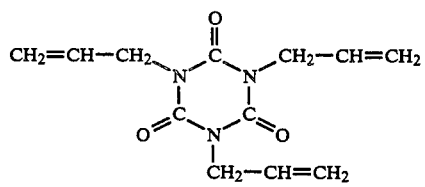

The mixture obtained above was pelletized at a temperature of 220° C. through a 40 mmφ extruder. The pellets thus obtained were injection molded at an injection temperature of 230° C. and an injection pressure of 750 kg/cm² in a 10 oz injection molding machine. Thus, flat plates having a size of 10 cm × 12 cm and a thickness of 2 mm were obtained.

The flat plates thus obtained were evaluated by 3.0 Mrad irradiation of γ-rays derived from a cobalt-60 source. The results are shown in Table 1.

TABLE 1

| No. | Composition | | Radiation stability[*0] | | |
|---|---|---|---|---|---|
| | | | ΔMFI[*1] | ΔE[*2] | ΔYI[*3] |
| Example 1 | Polymer I + TAIC | (0.05 parts) | −0.05 | 0.53 | 1.5 |
| Example 2 | Polymer I + TAIC | (0.25 parts) | −0.21 | 0.94 | 0.4 |
| Example 3 | Polymer II + TAIC | (0.05 parts) | −0.71 | 0.86 | 2.7 |
| Example 4 | Polymer I + | (0.50 | −0.54 | 0.60 | 4.1 |

TABLE 1-continued

| No. | Composition | | Radiation stability*0 | | |
|---|---|---|---|---|---|
| | | | ΔMFI*1 | ΔE*2 | ΔYI*3 |
| Example 5 | TAC Polymer I + TAIC | (parts) (0.25 parts) TAC (0.25 parts) | −0.75 | 0.80 | 2.1 |
| Comparative Example 1 | Polymer I + TAIC | (3.0 parts) | −0.68 | 0.1 | 0.4 |
| Comparative Example 2 | Polymer I | — | 3.0 | 0.05 | 7.0 |
| Comparative Example 3 | Polymer II | — | 4.1 | 0.05 | 9.7 |
| Comparative Example 4 | Polymer III | — | 3.4 | 0.05 | 8.1 |

*0Differences in properties before and after Co-60 irradiation.
*1MFI: Melt flow index (g/10 min) determined at 230° C. under a load of 2.16 kg according to a JIS-K-6758 method.
$$\Delta MFI = \frac{MFI \text{ (after irradiation)} - MFI \text{ (before irradiation)}}{MFI \text{ (before irradiation)}}$$
*2E: Tensile elongation (%) determined according to a JIS-K-6758 method
ΔE = E (after irradiation)/E (before irradiation)
*3YI: Yellowing Index determined according to a JIS-K-7103 method
ΔYI = YI$_1$ (after irradiation) − YI$_0$ (before irradiation)

As is clear from the results shown in Table 1, the changes in the MFI, tensile elongation, and yellowing degree of the polymer composition of the present invention are very small. Thus, the present polymer compositions having excellent radiation stability are suitable for use in production of medical equipments and accessories as well as food wrapping materials, subjected to a radiation sterilization treatment, and nuclear power plant materials.

EXAMPLES 6 TO 10 AND COMPARATIVE EXAMPLE 5

A 100 part amount of a polymer composition IV comprising 99.9% of propylene-ethylene random copolymer having an ethylene content of 1.8% and an MFI of 18 g/10 min, 0.05% of tetrakis(methylene(3,5-di-t-butyl-4-hydroxyphenyl)propionate)methane, and 0.05% of calcium stearate in the form of pellets was mixed with diallylphthalate (DAP) and/or diallylisophthalate (DAIP) in an amount listed in Table 2. The mixture was pelletized at a temperature of 220° C. through a 40 mmφ extruder.

The pellets obtained above were injection molded at an injection temperature of 230° C. and an injection pressure of 750 kg/cm² in a 10 oz injection molding machine. Thus, flat plates having a size of 10 cm × 12 cm and a thickness of 2 mm were obtained.

The flat plates thus obtained were evaluated by 3.0 Mrad irradiation of γ-rays derived from a cobalt-60 source. The results are shown in Table 2.

TABLE 2

| No. | Diallyl(iso)phthalate | | Radiation stability*1 | | |
|---|---|---|---|---|---|
| | | | ΔMFI*1 | ΔE*1 | ΔYI*1 |
| Example 6 | DAP | 0.05 part | 1.0 | 0.25 | 2.1 |
| Example 7 | DAP | 0.5 part | 0.4 | 0.3 | 1.7 |
| Example 8 | DAP | 1.0 part | −0.25 | 0.32 | 0.7 |
| Example 9 | DAIP | 0.5 part | −0.54 | 0.60 | 4.1 |
| Example 10 | DAP DAIP | 0.25 part 0.25 part | −0.75 | 0.40 | 2.1 |
| Comparative Example 5 | | 0 | 3.0 | less than 0.05 | 7.0 |

*1See footnote of Table 1.

As is clear from the results shown in Table 2, the changes in the MFI, tensile elongation, and Yellowing Index of the polymer composition of the present invention are very small. Thus, the present polymer compositions having excellent radiation stability are suitable for use in the production of medical equipments and accessories as well as food wrapping materials, subjected to a radiation sterilization treatment, and nuclear power plant materials.

EXAMPLES 11 TO 14 AND COMPARATIVE EXAMPLE 6 TO 10

A 100 part of polypropylene or propylene-ethylene copolymer having an ethylene content listed in Table 3 was thoroughly mixed with the modifier and the organic peroxide both listed in Table 3, 0.05 part of tetrakis[methylene(3,5-di-t-butyl-hydroxyphenyl)propionate]methane, 0.05 part of calcium stearate, and 0.35 part of dibenzylidene sorbitol.

The mixture obtained above was pelletized at a temperature of 220° C. through a 40 mmφ extruder. The pellets thus obtained were injection molded at an injection temperature of 230° C. and an injection pressure of 750 kg/cm² in a 10 oz injection molding machine. Thus, flat plates having a size of 10 cm × 12 cm and a thickness of 2 mm were obtained.

The flat plates thus obtained were evaluated by 3.0 Mrad irradiation of γ-rays derived from a cobalt-60 source. The results are shown in Table 3.

TABLE 3

| No. | Ethylene content (%) | Organic peroxide (part) | Modifier (part) | MFI (g/10 min) | No γ-ray irradiation | | |
|---|---|---|---|---|---|---|---|
| | | | | | Tensile strength*4 (kg/cm²) | Tensile elongation*5 (%) | Falling weight impact strength*6 (kg · cm) |
| Example 11 | 0 | A*1 0.05 | TAC 0.05 | 20 | 392 | 610 | 35 |
| Example 12 | 2.5 | A 0.01 | TAIC 0.05 | 23 | 343 | 590 | 111 |
| Example 13 | 3.1 | B*2 0.1 | TAIC 0.15 | 24 | 287 | 640 | 172 |
| Example 14 | 3.5 | C*3 0.15 | DAP 0.4 | 27 | 293 | 560 | 141 |
| Comparative Example 6 | 0 | 0 | 0 | 20 | 381 | 650 | 30 |
| Comparative Example 7 | 1.7 | C 0.1 | TAC 0 | 16 | 375 | 570 | 65 |
| Comparative Example 8 | 2.9 | A 0.1 | DAP 0.75 | 23 | 327 | 600 | 150 |
| Comparative Example 9 | 2.8 | 0 | 0 | 20 | 322 | 570 | 145 |
| Comparative Example 10 | 3.5 | C 0.3 | TAC 0.1 | 80 | 302 | 350 | 72 |

30 days standing at 50° C. after

TABLE 3-continued

|  | Immediately after 3 Mrad γ-ray irradiation | | | 3 Mrad γ-ray irradiation | | |
|---|---|---|---|---|---|---|
| No. | Tensile strength*4 (kg/cm²) | Tensile elongation*5 (%) | Falling weight impact strength*6 (kg · cm) | Tensile strength*4 (kg/cm²) | Tensile elongation*5 (%) | Falling weight impact strength*6 (kg · cm) |
| Example 11 | 384 | 210 | 25 | 398 | 140 | 20 |
| Example 12 | 351 | 280 | 46 | 376 | 50 | 33 |
| Example 13 | 284 | 650 | 158 | 291 | 100 | 103 |
| Example 14 | 304 | 490 | 116 | 343 | 64 | 55 |
| Comparative Example 6 | 320 | <25 | <5 | — | — | — |
| Comparative Example 7 | 365 | <25 | <5 | — | — | — |
| Comparative Example 8 | 339 | 220 | 80 | 345 | <25 | <5 |
| Comparative Example 9 | 324 | <25 | <5 | — | — | — |
| Comparative Example 10 | 250 | <25 | <5 | — | — | — |

Remarks
*1Organic peroxide A = 2,5-dimethyl-2,5-di(t-butylperoxy)hexane
*2Organic peroxide B = dibutylperoxide
*3Organic peroxide C = 1,3-bis(t-butylperoxyisopropyl)benzene
*4determined according to a JIS-K-6758 method
*5determined according to a JIS-K-6758 method
*6The injection molded flat plate having a thickness of 2 mm was used as a sample. Weights were dropped from a constant height. The energy (kg · cm) at which the plate was broken was listed in the table.

As is clear from the results shown in Table 3, when no modifier was present as in Comparative Examples 6, 7, and 9, the tensile elongation and impact strength of the molded articles were remarkably decreased after irradiation, regardless of the presence or absence of the organic peroxide both in the propylene homopolymer and propylene-ethylene copolymer. As shown in Comparative Example 8, when an excessive amount (i.e., 0.75 part) of the modifier was used, the tensile elongation and impact strength were decreased with the lapse of time after irradiation, although an appropriate amount of the organic peroxide was used. This seems to be caused by the post crosslinking after the irradiation. Contrary to this, as shown in Comparative Example 10, when an excessive amount (i.e., 0.3 part) of the organic peroxide was used, the tensile elongation and impact strength were low even before irradiation, although an appropriate amount of the peroxide was used. This seems to be caused by the excessive polymer chain scissions. The molded articles became very brittle after the irradiation.

Contrary to above, as is clearly shown in Examples 11 to 14, when appropriate amounts of the organic peroxide and the modifier were used, a desired polymer composition having excellent radiation stability was prepared regardless of the propylene homopolymer or propylene-ethylene copolymer.

Thus, the present polymer compositions can be suitably used in the production of medical equipments and accessories, as well as food wrapping materials, subjected to a radiation sterilization treatment, and nuclear power plant materials.

I claim:

1. A propylene polymer composition comprising (i) 100 parts by weight of at least one propylene polymer selected from the group consisting of polypropylenes and propylene-ethylene copolymers having an ethylene content of 7% by weight or less, (ii) 0.01 to 0.25 part by weight of at least one modifier selected from the group consisting of triallylcyanurate and triallylisocyanurate, and (iii) 0.005 to 0.2 part by of an organic peroxide.

2. A propylene polymer composition as claimed in claim 1, wherein the amount of the modifier is 0.05 to 0.25 part by weight, based on 100 parts by weight of the propylene polymer.

3. A propylene polymer composition as claimed in claim 1, wherein the amount of the organic peroxide is 0.005 to 0.1 part by weight.

* * * * *